June 7, 1960

N. A. BLAKE 2,939,910

DISTORTION-CORRECTING SYSTEM

Filed Nov. 25, 1955

INVENTOR.
NEAL A. BLAKE.
BY
Lockwood, Galt, Woodard + Smith,
ATTORNEYS.

2,939,910

DISTORTION-CORRECTING SYSTEM

Neal Axtell Blake, Fort Wayne, Ind., assignor to International Telephone and Telegraph Corporation Filed Nov. 25, 1955, Ser. No. 548,895
2 Claims. (Cl. 178—7.2)

This invention relates to circuits for correcting signal distortion generated in camera tubes or cathode ray tubes, and is particularly directed to means for neutralizing this distortion in the video signal.

Since it is not possible to reduce the cross-sectional size of a scanning beam of a camera tube to zero, there inevitably results a loss of definition as the beam moves between areas on the mosaic of different illumination. A further complicating factor is the non-uniform distribution of electrons in the beam. The current density across a well-focused beam may be defined as $(1+\cos x)$, where $x$ is the distance from the center of the beam.

An object of this invention is to reinsert in the video channel the high frequency components which are lost as the beam of finite cross-section scans a scene.

Another object of this invention is to improve fine detail reproduction in a given television signal.

Still another object is to provide means for correcting inherent distortion present in all camera tubes or cathode ray tubes.

This invention allows for optimum value of aperture correction for any given light condition. The higher the light intensity, the more correction can be used, and the better the fine detail. Low light conditions permit limited correction since noise is the limiting factor.

The above-mentioned and other features and objects of this invention and the manner of attaining them will become more apparent and the invention itself will be best understood by reference to the following description of an embodiment of the invention taken in conjunction with the accompanying drawings, wherein.

Figures 1, 2, 3, 4:
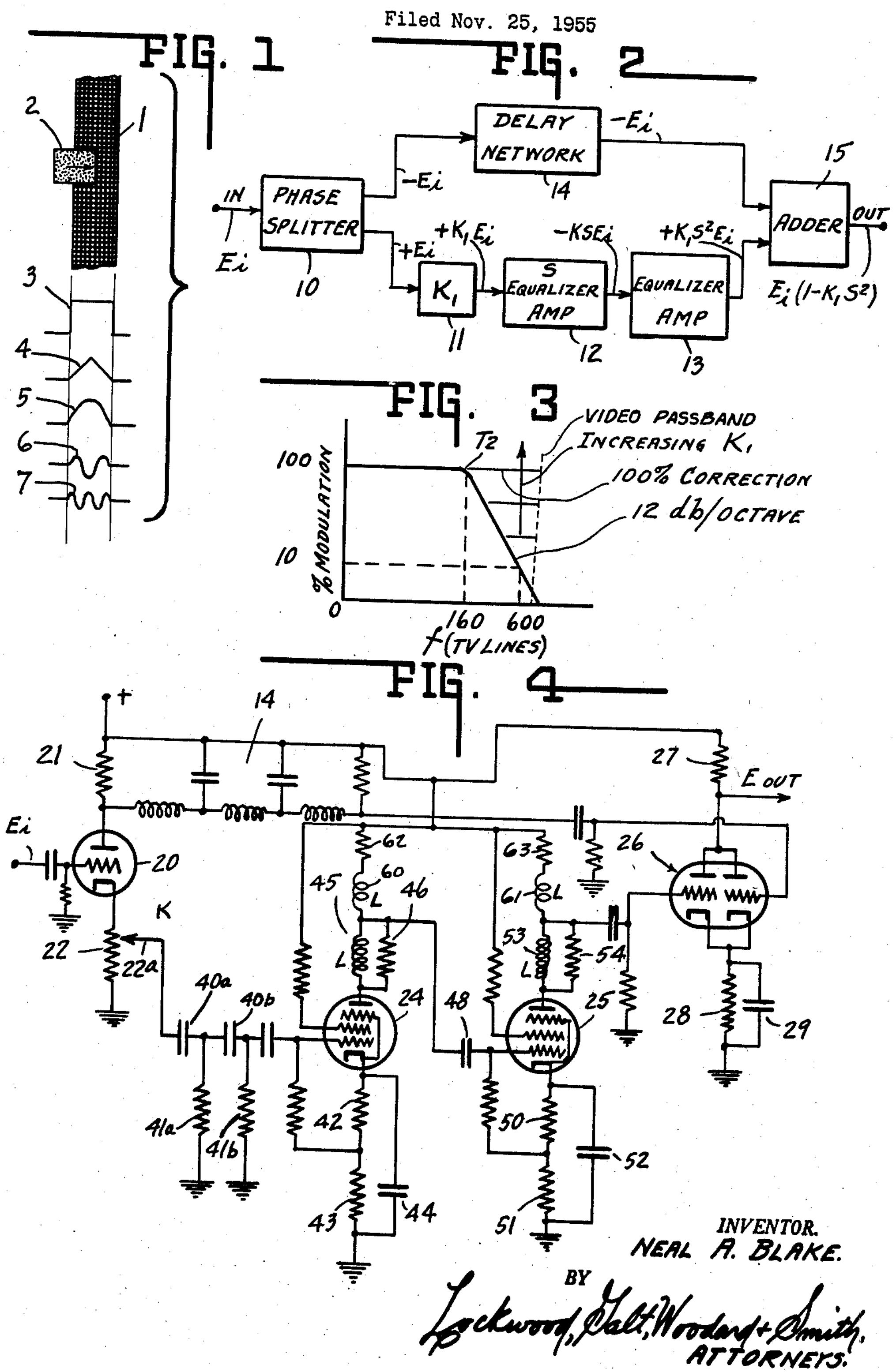
Fig. 1 shows an electron spot scanning a picture element and the resulting principal waveforms of such a scan.
Fig. 2 is a block diagram of this invention.
Fig. 3 is a graph showing the functional relation of signal current and frequency.
Fig. 4 is a circuit diagram of one embodiment of this invention.

In Fig. 1 is shown a picture element 1 which may be a black area against a white background or a white area against a black background. For the purposes of this discussion, the contrast of pure black and white will be considered. Assume that an electron beam, focused in the square area 2, transversely scans the picture element 1. A square beam is shown instead of a $(1+\cos x)$ distribution to simplify the discussion. The area 2 is finite in size and is as large in the horizontal (or scanned) dimension as the smallest picture element. In contrast therewith, the current distribution in an actual beam is such that the electrons are densest at the center and decrease to zero at the edges of the area, so that the distribution is approximately proportioned to $(1+\cos x)$ as more fully explained in Fink-Television Engineering, Second Edition 1952, pages 154–156.

For faithful reproduction by the assumed beam of the picture element in the video signal, the signal would be square cornered as at 3, Fig. 1, but unfortunately the signal rises to and decays from a single peak for the special case where the beam and picture element size are the same, much as shown at 4 in Fig. 1. The frequency components in such a response can be resolved into a fundamental and its harmonics shown by curves 5, 6, 7, etc.

This invention provides means for correcting for the degradation of high frequency components of the signal obtained from such a beam of the conventional camera tube. Since the camera beam is symmetrical, the distortion is such that the amplitude of the high frequency or fine detail components is reduced without any accompanying phase shift.

The equivalent admittance, Y, of the commercial camera tubes having $(1+\cos x)$ beam distribution may be expressed as $$\frac{1}{1+K_1\omega^2+K_2\omega^4+K_3\omega^6+\text{etc.}}$$

and as noted above, the scanning beam is symmetrical and no phase distortion accompanies the reduction in amplitude of the higher frequency components of the signal.

In practice, the above expression for admittance may be simplified to read:

$$Y=\frac{1}{1+K_1\omega^2}$$

by neglecting the unimportant terms $K_2\omega^4$, and beyond. The correction circuit must, then, have an inverse response of $(1+K_1\omega^2)$. The above equations represent the LaPlace transforms of the spot admittance described on page 154 and plotted on page 155 of the above referred to Fink reference.

Referring to Fig. 3, the curve of signal amplitude (or percent modulation) out of the camera tube plotted against signal frequency (or horizontal definition expressed as scanning lines) may be fitted with two asymptotes, one of which has a zero slope and the other a minus 12 db per octave slope. The break frequency or sudden change of slope is read from the intersection of the two asymptotes. Using the frequency corresponding to 160 TV lines per second, assuming standard RETMA scanning and retrace time, the value of $K_1$ is found to be $0.0064\times10^{-12}$ Sec. 2, for a fully corrected picture.

Calculations indicate that considerable illumination is required to maintain a usable picture with high signal-to-noise ratio when the attenuated high frequency components of the signal are completely restored due to the amplification of high frequency noise voltage components. For most operating conditions, something less than full aperture correction will be used, and in order to provide a system of maximum flexibility the amount of correction will be continuously variable from zero to 100% correction at the highest definition required of the particular system here chosen as 600 lines.

There is provided a 12 db per octave phaseless boost with an easily adjustable break frequency through the use of a non-minimum phase network. A phase splitter splits the incoming signal from the camera tube into two paths with signals of opposite phase. One path contains two differentiating amplifier stages. The other path contains a delay network to compensate for the amplifier delay in the first path. The two signals are mixed in an adder circuit giving a resultant output sginal which is $(1-K_1S^2)$ times the input signal where S is $j\omega$. A variable gain potentiometer in the amplifier path varies the gain component, $K_1$, so that the frequency at which the correction starts may be varied.

A block diagram of the circuit according to this invention for restoring the attenuated high frequency frequency components of the signal originating at a symmetrical (1+ cos $x$) beam is shown in Fig. 2, and the response of the system of Fig. 2 is shown in Fig. 3. In order to obtain the desired ratio of output signal to input signal, $$\frac{E_0}{E_{in}}=1+K_1\omega^2=1-K_1S^2$$

where $S=j\omega$, it is necessary to use a non-minimum phase type network. As shown in Fig. 2, the input signal $E_1$ is split in phase and is divided into two paths, one of which contains two differentiating amplifiers S and a gain control $K_1$. The other path contains a delay network. After the input signal amplitude is adjusted by the potentiometer, $K_1$, it is then passed through two cascaded differentiating amplifiers to obtain $S^2$. The differentiating or frequency selective amplifiers 24 and 25 in conjunction with RC networks 40*a*, 41*a* and 40*b*, 41*b*, respectively, comprise two compound peaked video amplifiers with differentiating networks 42, 43, 44 and 50, 51, 52, respectively, in the cathode circuits. Since some time delay is present in each amplifier exclusive of the desired differentiating action occurring in the cathode, this unwanted delay must be compensated for by inserting an equivalent delay in the other path. In the delay network, the signal passes through to the output unchanged insofar as operation of the aperture correcting circuits are concerned. It has been found convenient to employ a lumped-constant delay line to provide a delay commensurate with the delay in the amplifier branch. Outputs from the two paths are then added and the desired response obtained corrected for the original high frequency attenuations caused by the beam. It is seen that by increasing the gain, $K_1$, the frequency at which the high frequency correction starts is lower.

In Fig. 2 the input video signal $E_1$ is split as by a phase splitter 10 so that there are two outputs yielding plus $E_1$ and minus $E_1$. After passing through the gain control device 11, the signal may be indicated by plus $K_1E_1$ and after passing through the first equalizer amplifier 12, the signal voltage is inverted and becomes minus $K_1SE_1$, and after passing through the second equalizer amplifier 13 the signal is again inverted and becomes plus $K_1S^2E_1$. The details of the equalizer amplifiers will be referred to below in connection with Fig. 4. The parameters of the delay network 14 in the other branch are adjusted to cause a delay equal to the delay in the amplifier in the equalizer path. It follows that when the minus $E_1$ signal of one branch is arithmetically added in adder 15 to the plus $K_1S^2E_1$ signal of the other branch, the output of the adder is $E_1\ (1-K_1S^2)$. This output is the signal desired to reestablish the high frequency components of the signal which were attenuated by the beam.

By varying $K_1$ at the potentiometer 11, the break point frequency can be varied. It is seen that increasing $K_1$ lowers the frequency at which the high frequency boost starts.

Referring to Fig. 4, the particular phase splitter shown comprises the triode 20 with load resistances 21 and 22 in the anode and cathode sides, respectively, of the triode. The video signal from the camera, with amplification, is applied to the grid of the triode. The signals appearing at the anode and cathode terminals are of opposite polarity and are applied, respectively, to the delay network 14 and to the amplifiers 24 and 25. The delayed signal from network 14 is arithmetically added to the amplified signal from amplifiers 24 and 25 in the adder circuit 15. The particular adder circuit shown comprises two parallel triodes with the anodes connected together to the common load resistor 27 from across which the corrected video signal is obtained. The cathode bias resistor 28 is common to the two cathode circuits, and may be bypassed by the condenser 29 if higher gain is desired. The particular adder circuit shown is one of several possible configurations.

The delay network 14 is of the LC low-pass type with the inductive elements in series and capacitive elements in shunt. Such a delay network may be designed by well-known techniques to generate the desired time delay.

The important feature of the branch containing amplifiers 24 and 25 is the method of differentiating the signal. Each differentiating network is divided into two parts. Resistor 41*a* and capacitor 40*a* form one part of a differentiator. This RC network differentiates the signal over a frequency range from zero (0) to $f1$ cycles. The cathode circuit consisting of resistors 42 and 43 and capacitor 44 varies the gain of the compound peaked amplifier 24 and provides differentiating action over the frequency range $f1$ to $f2$ where $f2$ is well beyond the pass band of the video-system amplifiers. This combination thus provides differentiation of all frequencies from zero (0) to $f2$. The second differentiating action is similar and consists of the resistor 41*b*, capacitor 40*b*, resistors 50 and 51, capacitor 52, and amplifier 25. The inductances 60, 45, 53, and 61 and resistances 62, 46, 54, and 63 in the anode circuit of amplifiers 24 and 25 are parts of the compound peaking circuit of these amplifiers.

The components of these equalizer circuits are selected to provide the frequency characteristic, plus $(1+K_1^2\omega^2)$. By controlling the amount of signal passed through the amplifier branch, as by adjusting the wiper 22*a* on the phase splitter resistor 22, the amount of correction, $K_1$, can be controlled, and the break point $T_2$ (see Fig. 3) of the two asymptotes can be shifted, where $T_2=K_1$.

While I have described above the principles of my invention in connection with specific apparatus, it is to be clearly understood that this description is made only by way of example and not as a limitation to the scope of my invention.

What is claimed is:

1. A circuit for correcting signal distortion in a video system for a picture tube having a scanning beam with (1+cos $x$) electron distribution, a path consisting of two cascaded amplifier tube circuits, at least two series condensers and two resistors connected in shunt therewith connected to the input circuit of the first amplifier, one condenser-resistor pair differentiating all video frequencies from zero to $f1$, where $f1$ is an intermediate video frequency, and the other condenser-resistor pair differentiating all video frequencies from zero to $f1$ a second time; said amplifiers each having cathode resistors with condensers connected in parallel therewith for differentiating over the frequency range of $f1$ to $f2$, where $f2$ is a frequency higher than the highest frequency of the system.

2. The combination of claim 1 further comprising a second path parallel to the first mentioned path, said second path including a time delay network; a phase splitter circuit connected to said paths for introducing phase-opposed video signals, respectively, to the two paths, and an adder circuit connected to said paths for combining the outputs of the two paths.

References Cited in the file of this patent

UNITED STATES PATENTS

| | | |
|---|---|---|
| 2,289,500 | James | July 14, 1942 |
| 2,367,116 | Goldsmith | Jan. 9, 1945 |
| 2,679,758 | Little | Dec. 21, 1954 |
| 2,737,628 | Haines | Mar. 6, 1956 |
| 2,773,136 | Futterman | Dec. 4, 1956 |
| 2,776,410 | Guanella | Jan. 1, 1957 |
| 2,851,522 | Hollywood | Sept. 9, 1958 |